(12) United States Patent
Matsushima et al.

(10) Patent No.: US 11,936,836 B2
(45) Date of Patent: Mar. 19, 2024

(54) INFORMATION PROCESSING APPARATUS, SYSTEM, METHOD, AND RECORDING MEDIUM FOR DERIVING AMOUNTS OF METALLIC COLORANT AND PROCESS COLORANTS BASED ON PRIORITY DETERMINED FROM A TARGET COLOR PATCH

(71) Applicants: Yuki Matsushima, Kanagawa (JP); Yukiko Maeo, Kanagawa (JP)

(72) Inventors: Yuki Matsushima, Kanagawa (JP); Yukiko Maeo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/053,617

(22) Filed: Nov. 8, 2022

(65) Prior Publication Data

US 2023/0171367 A1    Jun. 1, 2023

(30) Foreign Application Priority Data

Nov. 30, 2021    (JP) .................................. 2021-194613

(51) Int. Cl.
*H04N 1/60*    (2006.01)
*H04N 1/54*    (2006.01)

(52) U.S. Cl.
CPC .............. *H04N 1/605* (2013.01); *H04N 1/54* (2013.01); *H04N 1/6038* (2013.01)

(58) Field of Classification Search
CPC ......... H04N 1/54; H04N 1/605; H04N 1/6038
See application file for complete search history.

(56) References Cited

U.S. PATENT DOCUMENTS

| | | | | |
|---|---|---|---|---|
| 8,711,432 | B2 * | 4/2014 | Ito ............................. | H04N 1/54 358/1.9 |
| 8,780,349 | B2 * | 7/2014 | Okumura .................. | G01J 3/02 356/402 |
| 10,389,915 | B2 * | 8/2019 | Tashiro ..................... | H04N 1/54 |
| 10,397,447 | B2 * | 8/2019 | Kubo ................. | H04N 1/00408 |
| 10,506,132 | B2 * | 12/2019 | Kubo ....................... | H04N 1/60 |
| 11,553,109 | B2 * | 1/2023 | Watanabe .............. | G03G 15/01 |

(Continued)

FOREIGN PATENT DOCUMENTS

JP    2013-230586    11/2013
JP    2017-138518    8/2017

(Continued)

*Primary Examiner* — Scott A Rogers
(74) *Attorney, Agent, or Firm* — Harness, Dickey & Pierce, P.L.C.

(57) ABSTRACT

An information processing apparatus, an information processing system, an information processing method, and a non-transitory recording medium. The information processing apparatus acquires colorimetric values from a patch of a target color with metallicity, the colorimetric values being measured by a colorimeter, calculates two or more physical quantities including a metallic value indicating a degree of metallicity and a color value indicating a degree of color from the colorimetric values, determines priority of the physical quantities of the target color, and derives an amount of metallic colorant and an amount of process color colorant in an image forming apparatus from the two or more physical quantities according to the priority.

19 Claims, 11 Drawing Sheets

(56) References Cited

U.S. PATENT DOCUMENTS

| | | | |
|---|---|---|---|
| 11,685,178 B2* | 6/2023 | Bailey | H04N 1/54 347/100 |
| 2002/0024609 A1 | 2/2002 | Matsushima | |
| 2008/0002216 A1 | 1/2008 | Matsushima | |
| 2009/0147313 A1 | 6/2009 | Miyagi et al. | |
| 2009/0168108 A1 | 7/2009 | Matsushima | |
| 2010/0134811 A1* | 6/2010 | Fukasawa | H04N 1/54 358/1.9 |
| 2014/0043623 A1* | 2/2014 | Koyatsu | G03G 15/0121 358/1.1 |
| 2017/0227904 A1 | 8/2017 | Matsuoka | |
| 2019/0260912 A1 | 8/2019 | Matsushima | |
| 2021/0029270 A1 | 1/2021 | Matsushima | |
| 2021/0329144 A1 | 10/2021 | Matsushima et al. | |
| 2022/0070335 A1 | 3/2022 | Matsushima | |
| 2023/0291863 A1* | 9/2023 | Moriwaki | H04N 1/6022 358/1.9 |

FOREIGN PATENT DOCUMENTS

| | | |
|---|---|---|
| JP | 2019-004322 | 1/2019 |
| JP | 7163836 B2 * | 11/2022 |
| JP | 2023-95627 A * | 7/2023 |

* cited by examiner

FIG. 11A

| COLOR NAME | L* | a* | b* |
|---|---|---|---|
| PANTONE 180C | 45.5 | 54.5 | 3705 |
| PANTONE 341C | 44.2 | -49.5 | 8.4 |
| PANTONE 611C | 80 | -6.3 | 69.9 |
| PANTONE 7489C | 65.3 | -32.4 | 38.1 |
| PANTONE 7570C | 63 | 28.5 | 57.9 |
| PANTONE 7647C | 43.6 | 50.4 | -5.6 |
| PANTONE 7673C | 37.4 | 10.1 | -28.7 |
| PANTONE 7690C | 45.3 | -16.9 | -37.1 |
| PANTONE 7712C | 47.6 | -40.3 | -26.4 |

FIG. 11B

| COLOR NAME | C | M | Y | K |
|---|---|---|---|---|
| PANTONE 180C | 3.5 | 92.1 | 81.4 | 12.8 |
| PANTONE 341C | 92.9 | 5.5 | 76.2 | 19.4 |
| PANTONE 611C | 2.7 | 7.4 | 84 | 10.8 |
| PANTONE 7489C | 54.9 | 2 | 78.6 | 7.9 |
| PANTONE 7570C | 1.6 | 54.8 | 89.6 | 6.2 |
| PANTONE 7647C | 8.5 | 83.2 | 6.7 | 24.5 |
| PANTONE 7673C | 69 | 57.9 | 6.4 | 25.4 |
| PANTONE 7690C | 85.7 | 25.6 | 4.2 | 16.4 |
| PANTONE 7712C | 93.6 | 3.1 | 30.5 | 11.1 | ial
INFORMATION PROCESSING APPARATUS, SYSTEM, METHOD, AND RECORDING MEDIUM FOR DERIVING AMOUNTS OF METALLIC COLORANT AND PROCESS COLORANTS BASED ON PRIORITY DETERMINED FROM A TARGET COLOR PATCH

CROSS-REFERENCE TO RELATED APPLICATIONS

This patent application is based on and claims priority pursuant to 35 U.S.C. § 119(a) to Japanese Patent Application No. 2021-194613, filed on Nov. 30, 2021, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Background Art

In recent electrophotographic printing, special colorants are sometimes used, in addition to conventionally used cyan, magenta, yellow, and black (CMYK) colorants, in order to expand color expression. For example, by using a metallic colorant having metallic luster such as gold toner and silver toner, a pearl colorant, and a glittering colorant such as a mica colorant, a glossy color image is formed. In the following description, the color produced by the glittering colorant is referred to as a metallic color for the sake of convenience. Offset printing using glittering colorants has been the mainstream for printing metallic colors.

In offset printing, color sample patches are commercially available for the purpose of printing an ideal metallic color, and a user designates a color with the color sample patch. As illustrated in FIG. 17, colorants are mixed to reproduce the color sample patch, and a printing company uses the mixed colorants for printing. Here, the colors registered in a color sample book are called spot colors (special colors).

On the other hand, in electrophotographic printing, an image is formed by overlapping layers of color toner as illustrated in FIG. 18. Unlike the offset printing, colorants are not mixed, and printing is possible on demand. A disadvantage is that the color toner of the lower layer may be covered with the color toner of the upper layer according to the order in which the toners are stacked. In general, metallic toner using metal have higher shielding properties than process color toners using pigments. Therefore, the metallic toner is often placed in the bottom layer closest to the paper.

SUMMARY

Embodiments of the present disclosure describe an information processing apparatus, an information processing system, an information processing method, and a non-transitory recording medium. The information processing apparatus acquires colorimetric values from a patch of a target color with metallicity, the colorimetric values being measured by a colorimeter, calculates two or more physical quantities including a metallic value indicating a degree of metallicity and a color value indicating a degree of color from the colorimetric values, determines priority of the physical quantities of the target color, and derives an amount of metallic colorant and an amount of process color colorant in an image forming apparatus from the two or more physical quantities according to the priority.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 11A and 11B are tables illustrating an example of spot color dictionary;

Figure 1:
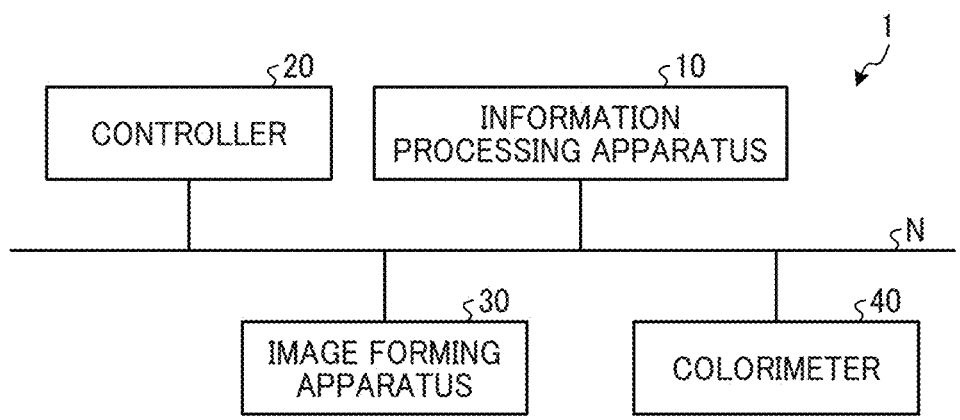
FIG. 1 is a block diagram illustrating an example of a configuration of an information processing system according to embodiments of the present disclosure.

The accompanying drawings are intended to depict embodiments of the present disclosure and should not be

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a detailed description is given of several embodiments of an information processing apparatus, an information processing system, an information processing method and non-transitory recording medium with reference to accompanying drawings. The present disclosure, however, is not limited to the following embodiments, and the constituent elements of the following embodiments include elements that can be easily conceived by those skilled in the art, those being substantially the same ones, and those being within equivalent ranges. Furthermore, various omissions, substitutions, changes and combinations of the constituent elements can be made without departing from the gist of the following embodiments.

FIG. 1 is a block diagram illustrating an example of a configuration of an information processing system according to the present embodiment. An overall configuration of the information processing system 1 according to the present embodiment is described with reference to FIG. 1.

As illustrated in FIG. 1, the information processing system 1 includes an information processing apparatus 10, a controller 20, an image forming apparatus 30, and a colorimeter 40. The information processing apparatus 10, the controller 20, the image forming apparatus 30, and the colorimeter 40 are capable of data communication with each other through a network N such as a local area network (LAN).

The information processing apparatus 10 is an information processing apparatus such as a personal computer (PC) or a workstation that receives a colorimetric value of a target color measured by the colorimeter 40, derives (calculates) a device value containing metallic silver (Si) from the colorimetric value, and creates a spot color dictionary that associates the derived device value with the target color. Here, the target color is, for example, the color number 599 to 621 of the DIC color guide, or the color of the color patch (metallic patch) of the color sample book formed by offset printing such as PANTONE Metallic Coated Guide. Further, the device value indicates a five-color device value obtained by adding metallic silver (Si) to C, M, Y, and K, which are process colors. In addition, "high metallicity" and "high metallic value" are equivalent to "high brightness", and "strong (high) color" and "high color value" are equivalent to "high saturation" or "colorful".

The controller 20 is an information processing apparatus such as a digital front end (DFE) that performs color conversion on a received print job using the spot color dictionary from the information processing apparatus 10, and transmits color-converted image data to the image forming apparatus 30 for printing. The controller 20 is implemented by, for example, a computer system including components such as a CPU and a memory. The controller 20 may be referred to as control circuitry.

The image forming apparatus 30 is a printing apparatus for printing the image data under the control of the controller 20. In the present embodiment, the image forming apparatus 30 is described as an apparatus that performs a printing operation by electrophotographic printing.

The colorimeter 40 is a device such as a multi-angle spectral colorimeter that measures the color of the metallic patch of the target color from a plurality of directions and transmits the obtained colorimetric values to the information processing apparatus 10.

Figure 2:
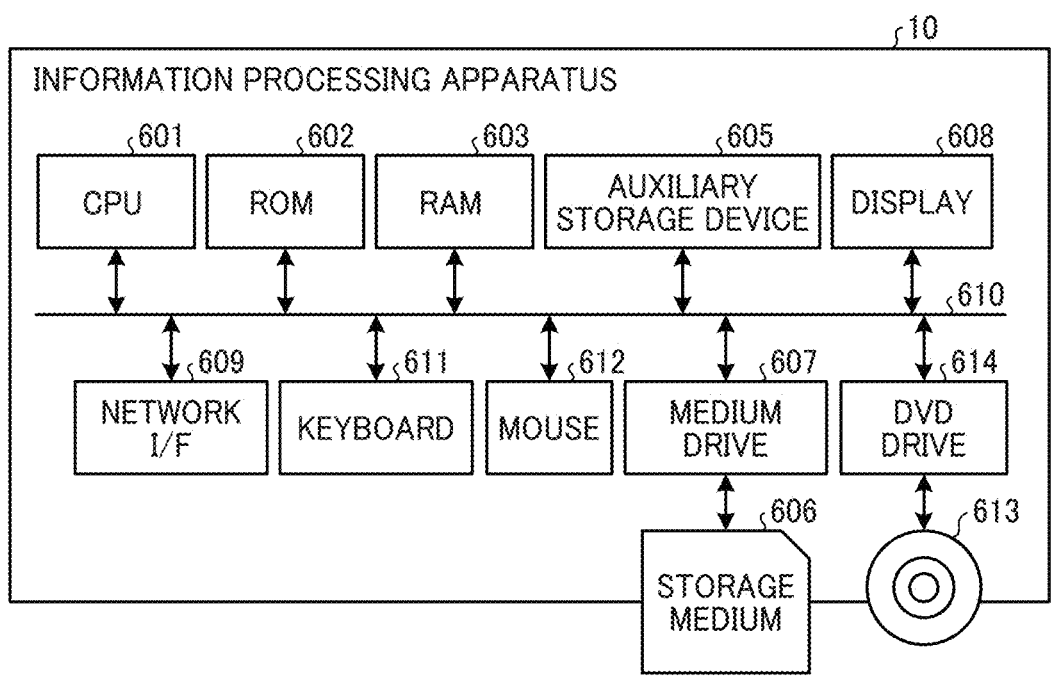
FIG. 2 is a block diagram illustrating an example of a hardware configuration of an information processing apparatus according to embodiments of the present disclosure.

FIG. 2 is a block diagram illustrating an example of a hardware configuration of the information processing apparatus according to the present embodiment. The hardware configuration of the information processing apparatus 10 according to the present embodiment is described with reference to FIG. 2.

As illustrated in FIG. 2, the information processing apparatus 10 includes a central processing unit (CPU) 601, a read only memory (ROM) 602, a random access memory (RAM) 603, an auxiliary storage device 605, a medium drive 607, a display 608, a network interface (I/F) 609, a keyboard 611, a mouse 612, and a digital versatile disc (DVD) drive 614.

The CPU 601 is a processor that controls an entire operation of the information processing apparatus 10. The ROM 602 is a non-volatile storage device that stores a program for the information processing apparatus 10. The RAM 603 is a volatile storage device used as a work area for the CPU 601.

The auxiliary storage device 605 is a storage device such as a hard disk drive (HDD) or a solid state drive (SSD) for storing a color prediction model and the spot color dictionary, which are described below, as well as various data and programs. The medium drive 607 controls reading and writing of data from and to a storage medium 606 such as a flash memory according to the control of the CPU 601.

The display 608 is a display device implemented by a liquid crystal or an organic electro-luminescence (EL) for displaying various information such as a cursor, a menu, a window, characters, or an image.

The network I/F 609 is an interface for communicating data with an external device such as the controller 20 and the colorimeter 40 using the network N. The network I/F 609 is, for example, a network interface card (NIC) or the like that supports ETHERNET (registered trademark) and is capable of communication conforming to transmission control protocol/internet protocol (TCP/IP) or the like.

The keyboard 611 is an input device for selecting characters, numbers, various instructions, moving a cursor, and the like. The mouse 612 is an input device for selecting and executing various instructions, selecting a processing target, moving a cursor, and the like.

The DVD drive 614 is a device that controls reading and writing of data from and to a DVD 613 such as a digital versatile disc read only memory (DVD-ROM) or a digital versatile disc recordable (DVD-R) as an example of a removable storage medium.

The CPU 601, ROM 602, RAM 603, auxiliary storage device 605, medium drive 607, display 608, network I/F 609, keyboard 611, mouse 612, and DVD drive 614 are capable of communicating with each other through a bus 610 such as an address bus and a data bus.

Note that the hardware configuration of the information processing apparatus 10 illustrated in FIG. 2 is an example and may not include all the components illustrated in FIG. 2 or may include other components. The hardware configuration of the controller 20 conforms to the hardware configuration illustrated in FIG. 2.

Figure 3:
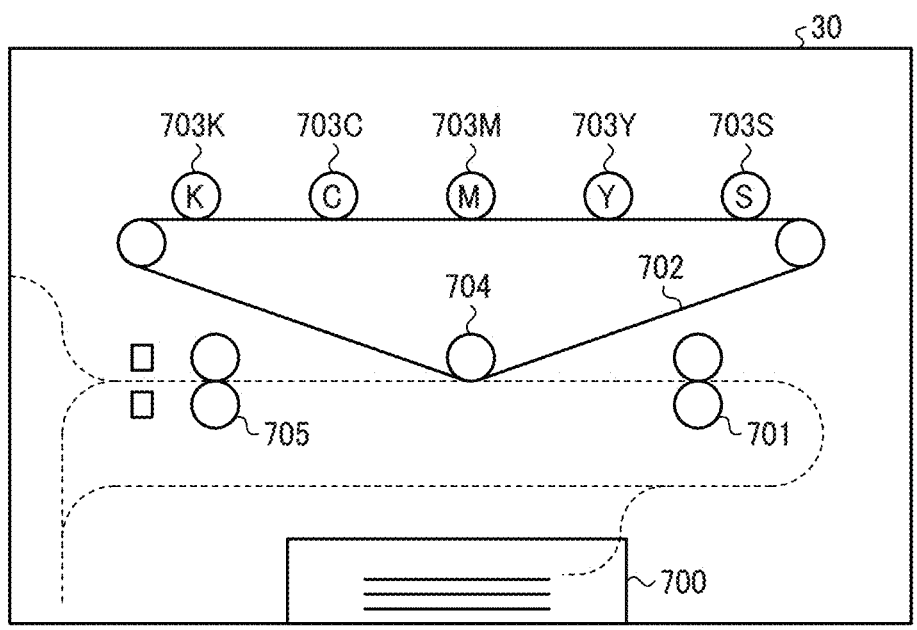
FIG. 3 is a block diagram illustrating a hardware configuration of the image forming apparatus according to embodiments of the present disclosure.

FIG. 3 is a diagram illustrating an example of a hardware configuration of the image forming apparatus according to the present embodiment. The hardware configuration of the image forming apparatus 30 according to the present embodiment is described with reference to FIG. 3.

As illustrated in FIG. 3, the image forming apparatus 30 is, for example, a tandem type printing apparatus, and includes a paper feed tray 700, a conveyance roller 701, an intermediate transfer belt 702, photoconductor drums 703C, 703M, 703Y, 703K, 703S, a transfer roller 704 and a fixing roller 705. In addition to those elements illustrated in FIG. 3, the image forming apparatus 30 may include an optical writing device that forms an image according to image data on each of the photoconductor drums 703C to 703S. Further, the image forming apparatus 30 may include a controller that controls printing, which may be implemented by circuitry, such as CPU or ASIC.

The paper feed tray 700 is a tray in which recording media such as paper for feeding are accommodated. The conveyance rollers 701 are a pair of rollers that transport the recording medium fed from the paper feed tray 700 to the transfer roller 704 along the transport path.

The intermediate transfer belt 702 is an endless belt on which an intermediate transfer image is formed by the photoconductor drums 703C, 703M, 703Y, 703K, and 703S. The intermediate transfer belt 702 rotates clockwise in FIG. 3, and toner images of respective colors are formed on the photoconductor drums 703K, 703C, 703M, 703Y, and 703S in this order.

The photoconductor drum 703C is a photoconductor drum for forming a cyan toner image on the intermediate transfer belt 702. The photoconductor drum 703 M is a photoconductor drum for forming a magenta toner image on the intermediate transfer belt 702. The photoconductor drum 703Y is a photoconductor drum for forming a yellow toner image on the intermediate transfer belt 702. The photoconductor drum 703K is a photoconductor drum for forming a black toner image on the intermediate transfer belt 702. The photoconductor drum 703S is a photoconductor drum for forming a toner image of a special color on the intermediate transfer belt 702. Here, the special color is, for example, a metallic colorant having a metallic luster such as a gold toner or a silver toner, a pearl colorant, a glitter colorant such as a mica colorant, or the like. In order to form an intermediate transfer image on the intermediate transfer belt 702, the photoconductor drums 703S, 703Y, 703M, 703C, and 703K are arranged in this order from the upstream in rotation direction of the intermediate transfer belt 702. As a result of forming a toner image of each color, a full-color image is formed as an intermediate transfer image on the surface of the intermediate transfer belt 702. The photoconductor drums 703C, 703M, 703Y, 703K, and 703S are simply referred to as "photoconductor drum 703" when indicating the photoconductor drum of any color or collectively. Further, the photoconductor drum 703 is configured with CMYK process colors, but cyan, magenta, and yellow (CMY) colors may be used as process colors, or red, green, and blue (RGB) may be used instead of CMY colors.

The transfer roller 704 is a roller that transfers the full-color image (intermediate transfer image) formed on the intermediate transfer belt 702 onto the recording medium conveyed by the conveyance roller 701. A full-color image is formed (printed) on the recording medium by the function of the transfer roller 704.

In this case, a metallic color layer is a bottom layer of the full-color image formed on the recording medium due to the formation order of the colors of the intermediate transfer image on the intermediate transfer belt 702 described above, forming "underlayer" of the metallic colorant.

The fixing roller 705 is a roller for fixing the image on the recording medium on which the full-color image is formed.

Figure 4:
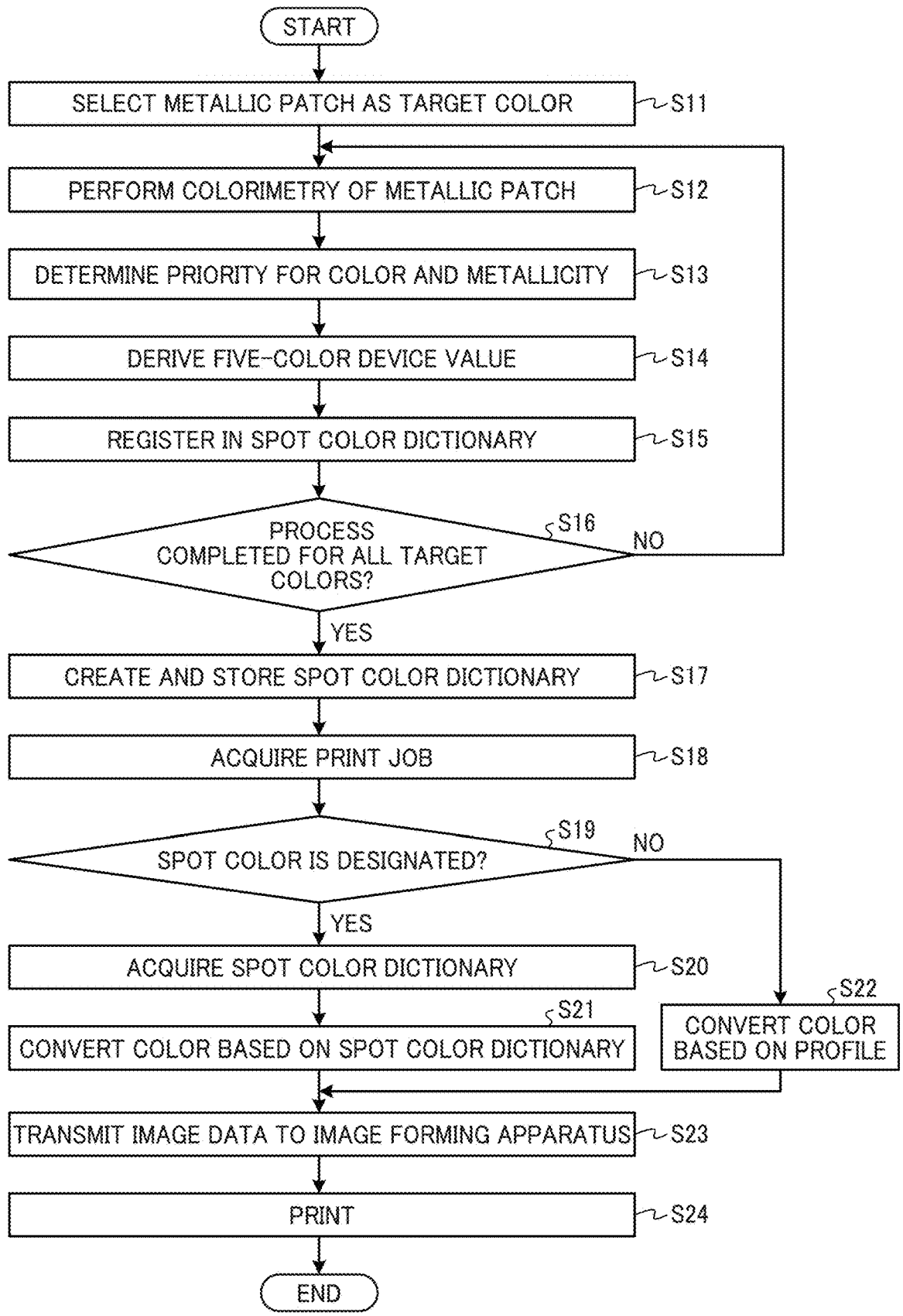
FIG. 4 is a flow chart illustrating an example of an overall operation of the information processing system according to embodiments of the present disclosure.

FIG. 4 is a flow chart illustrating an example of an overall operation of the information processing system according to the present embodiment. The overall operation of the information processing system 1 according to the present embodiment is described with reference to FIG. 4.

In step S11, the user selects one or more metallic color patches as target colors from a color sample book.

In step S12, the user causes the colorimeter 40 to perform colorimetry of the selected target color patch. The user may directly operate the colorimeter 40 to perform the colorimetry operation, or the colorimeter 40 may be caused to perform the colorimetry operation through the operation of an operation unit (keyboard 611, mouse 612) of the information processing apparatus 10. Accordingly, the information processing apparatus 10 receives a colorimetric value from the colorimeter 40.

In step S13, the information processing apparatus 10 determines priority for color and metallicity based on the colorimetric value received from the colorimeter 40.

In step S14, the information processing apparatus 10 determines (derives) the five-color device value based on the colorimetric value and the priority.

In step S15, the information processing apparatus 10 registers the derived five-color device value in the spot color dictionary.

In step S16, the information processing apparatus 10 determines whether the process of deriving five-color device value has been completed for all patches of the target color (metallic color) selected in step S11. Based on a determination that the five-color device value is derived, (step S16: Yes), the process proceeds to step S17. Based on a determination that the five-color device value is not derived (step S16: No), the process returns to step S12.

In step S17, the information processing apparatus 10 completes creation of the spot color dictionary by registering the five-color device values derived for all the selected target color patches in the spot color dictionary, and stores the spot color dictionary in the auxiliary storage device 605.

In step S18, the controller 20 acquires the print job according to the user's instruction.

In step S19, the controller 20 determines whether a spot color is designated for the color designated in the received print job. In the case the spot color is designated (step S19: Yes), the process proceeds to step S20, and in the case the spot color is not designated (step S19: No), the process proceeds to step S22.

In step S20, the controller 20 acquires the spot color dictionary stored in the auxiliary storage device 605 in the information processing apparatus 10.

In step S21, the controller 20 uses the acquired spot color dictionary to perform a color conversion process for converting the spot color designated in the print job into the five-color device value.

In step S22, the controller 20 uses a normal International Color Consortium (ICC) profile to perform the color conversion process for converting RGB value or CMYK value designated in the print job into a device value compatible with the image forming apparatus 30.

In step S23, the controller 20 transmits the image data obtained by the color conversion process to the image forming apparatus 30.

In step S24, the image forming apparatus 30 prints the image data received from the controller 20.

The entire operation of the information processing system 1 is performed by the process of steps S11 to S24 described above.

Figure 5:
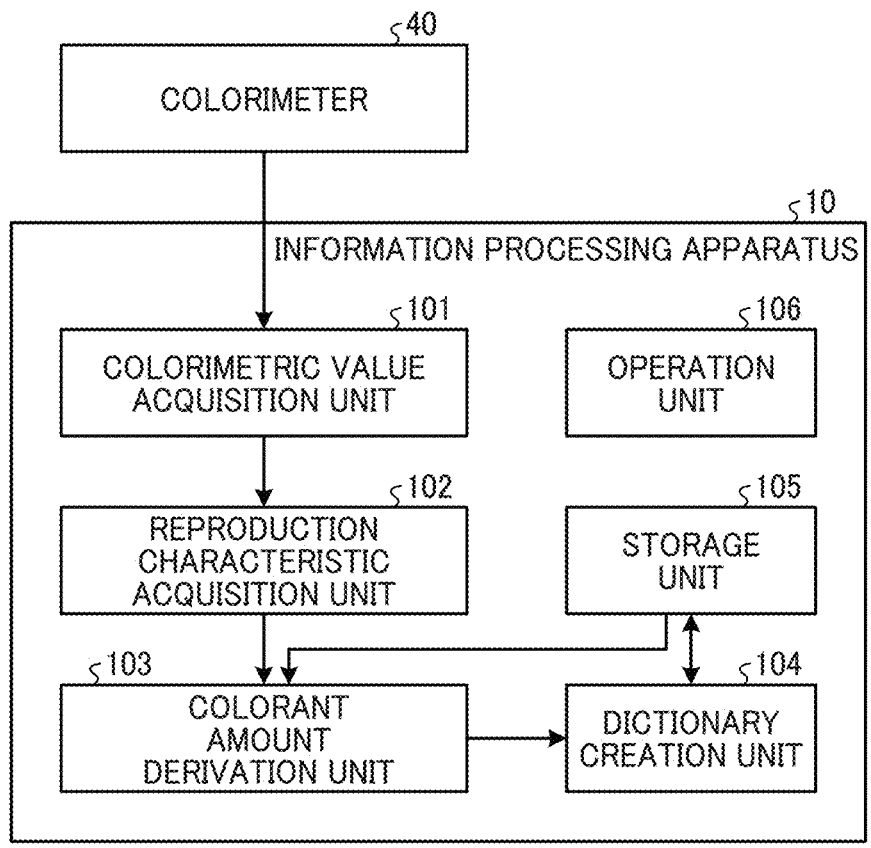
FIG. 5 is a block diagram illustrating an example of a functional configuration of the information processing apparatus according to embodiments of the present disclosure.
Figure 6:
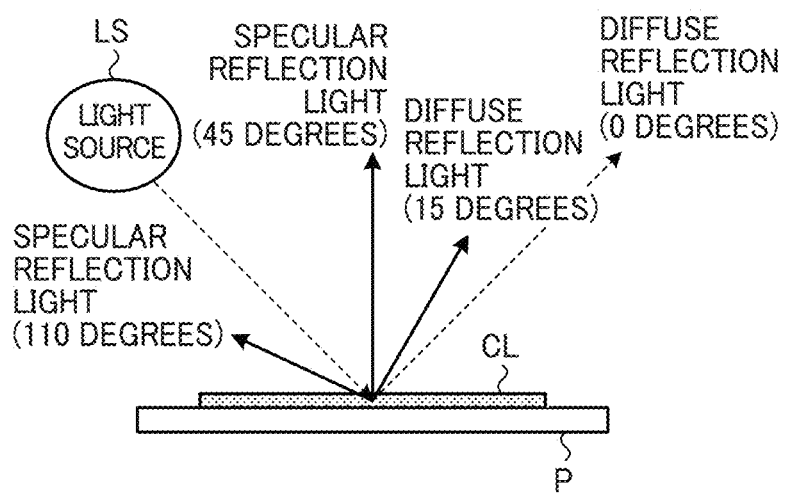
FIG. 6 is a diagram illustrating a colorimetric operation of a colorimeter according to embodiments of the present disclosure.

FIG. 5 is a block diagram illustrating an example of a functional configuration of the information processing apparatus according to the present embodiment. FIG. 6 is a diagram illustrating a colorimetric operation of the colorimeter according to the present embodiment. The functional configuration and operation of the information processing apparatus 10 according to the present embodiment is described with reference to FIGS. 5 and 6.

As illustrated in FIG. 5, the information processing apparatus 10 includes a colorimetric value acquisition unit 101, a reproduction characteristic acquisition unit 102, a colorant amount derivation unit 103, and a dictionary creation unit 104, a storage unit 105 and an operation unit 106.

The colorimetric value acquisition unit 101 acquires through the network I/F 609, a plurality of colorimetric values acquired by measuring the patch of the target color (metallic color) from the plurality of directions with the colorimeter 40 and sends the colorimetric values to the reproduction characteristic acquisition unit 102. With reference to FIG. 6, details of the colorimetric operation by the colorimeter 40 are described. The colorimeter 40 is a multiangle spectrophotometer, and in colorimetric processing, light emitted from a light source LS in an oblique direction (a direction of 45 degrees with respect to the normal line) is applied to printing paper P (an example of a recording medium). Assuming that the direction of specularly reflected light when reflected by the colorant layer CL is formed at 0 degrees, the colorimetric value in the direction of 15 degrees, the colorimetric value in the direction of 45 degrees as diffusely reflected light, and the colorimetric value in the direction of 110 degrees, which is the same diffusely reflected light, are obtained. Specifically, these colorimetric values are values based on spectral reflectance in each direction.

As described above, the colorimetric value acquisition unit 101 acquires the colorimetric values of the directions of 15 degrees, 45 degrees, and 110 degrees measured by the colorimeter 40 of the patch of the target color.

The reproduction characteristic acquisition unit 102 is a functional unit for calculating a "metallic value" and a "color value" as two physical quantities (evaluation values) from the plurality of colorimetric values received from the colorimetric value acquisition unit 101, and for sending the calculated values to the colorant amount derivation unit 103. The metallic value is the physical quantity that quantifies a degree of metallicity of an object measured by the colorimeter 40, and is generally calculated using colorimetric values measured in multiple directions. The color value is the physical quantity that quantifies a degree of color (chromaticity) of an object measured by the colorimeter 40. In the present embodiment, for example, the metallic value is described as a flop index that is generally used as a method of measuring color with optical anisotropy.

As illustrated in FIG. 6 the flop index is calculated by the following formula (1) in which the difference between the L value of 15 degrees and the L value of 110 degrees is normalized by the L value of 45 degrees, using L value out of Lab values measured in directions of 15 degrees, 45 degrees, and 110 degrees when the direction of specularly reflected light of light emitted from the light source (LS) from a direction of 45 degrees with respect to the normal line is assumed to be 0 degrees.

$$F.I = 2.69(L^*_{15} - L^*_{110})^{1.11}/(L^*_{45})^{0.85} \quad (1)$$

In the above formula (1), F. I is the flop index, $L^*_{15}$ is the L value in the 15 degree direction, $L^*_{45}$ is the L value in the 45 degree direction, and $L^*_{110}$ is the L value in the 110 degree direction. The flop index F. I is a physical quantity that gives a higher brilliance (metallicity) as the value increases. On the other hand, the color value is assumed to be a Lab value representing saturation and density in the 45-degree direction, which are conventional indices. Note that the metallic value is not limited to the flop index, and may be replaced by another index value or evaluation value.

The colorant amount derivation unit 103 is a functional unit that determines the priority of color and metallicity using the metallic value and the color value calculated by the reproduction characteristic acquisition unit 102, derives a five-color device value (cyan, magenta, yellow, black, and metallic silver (CMYKSi) value) suitable for the priority using the priority and the color prediction model stored in the storage unit 105, and sends the five-color device value to the dictionary creation unit 104. Details of the configuration and operation of the colorant amount derivation unit 103 are described below.

The dictionary creation unit 104 is a functional unit that reads target color information from the storage unit 105 (target color used as a basis for the colorimetric values acquired by the colorimetric value acquisition unit 101), creates the spot color dictionary that associates the target color with the five-color device value derived by the colorant amount derivation unit 103 and stores the spot color dictionary in the storage unit 105.

The storage unit 105 is a functional unit that stores the spot color dictionary created by the dictionary creation unit 104, target color information, color prediction model, and the like. The storage unit 105 is implemented by the auxiliary storage device 605 illustrated in FIG. 2.

The operation unit 106 is a functional unit that receives operational inputs. The operation unit is an example of a user interface. Note that the operation unit 106 may receive the operation for the colorimeter 40 in addition to the operation for the information processing apparatus 10. The operation unit 106 is implemented by the keyboard 611 and the mouse 612 illustrated in FIG. 2.

The colorimetric value acquisition unit 101, the reproduction characteristic acquisition unit 102, the colorant amount derivation unit 103, and the dictionary creation unit 104 described above are implemented by executing programs by the CPU 601 illustrated in FIG. 2. At least some of the functional units of the information processing apparatus 10 illustrated in FIG. 5 may be implemented by a hardware circuit such as Field-Programmable Gate Array (FPGA) or Application Specific Integrated Circuit (ASIC).

Further, each functional unit of the information processing apparatus 10 illustrated in FIG. 5 conceptually illustrates a function and is not limited to such a configuration. For example, a plurality of functional units illustrated as independent functional units in the information processing apparatus 10 illustrated in FIG. 5 may be configured as one functional unit. On the other hand, in the information processing apparatus 10 illustrated in FIG. 5, function of one functional unit may be divided into a plurality of units to be configured as a plurality of functional units.

Figure 7:
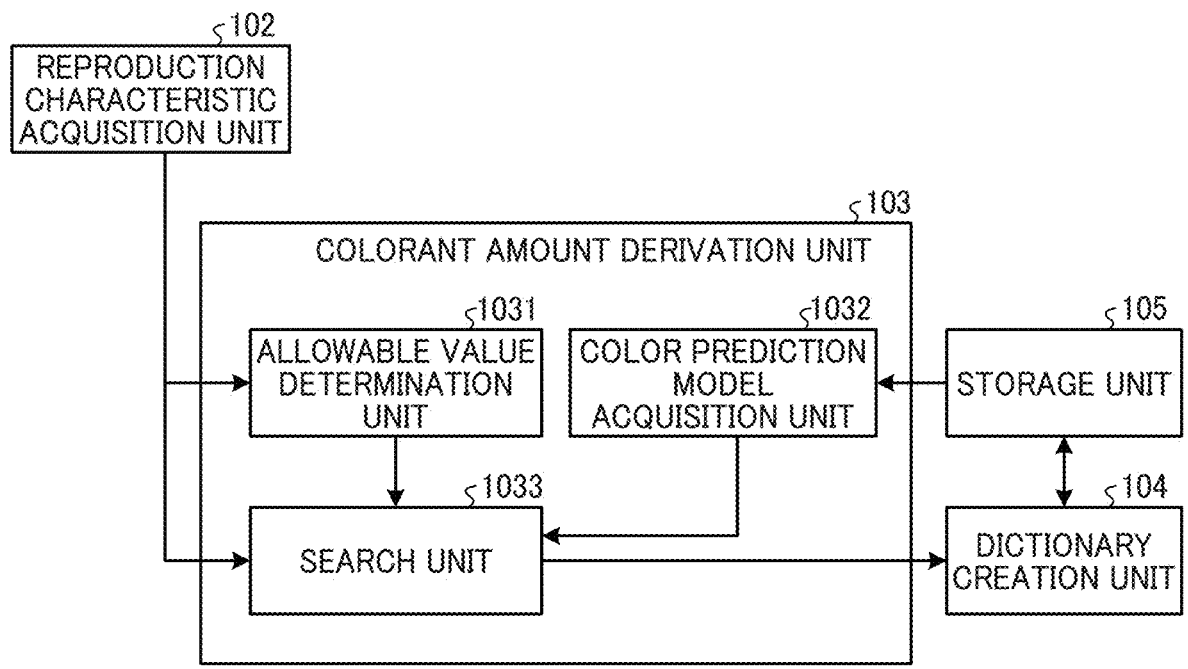
FIG. 7 is a block diagram illustrating an example of a functional configuration of a colorant amount derivation unit of the information processing apparatus according to embodiments of the present disclosure.
Figure 8:
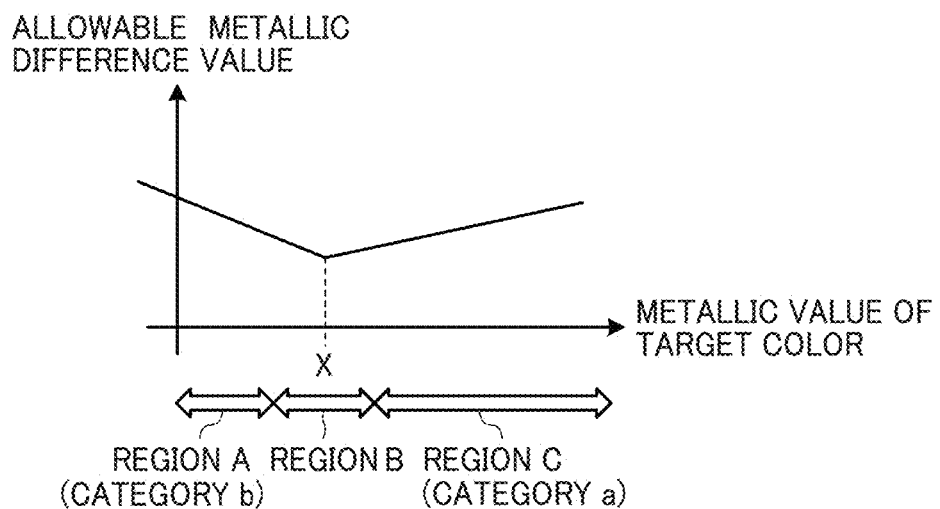
FIG. 8 is a diagram illustrating an allowable metallic difference value.
Figure 9:
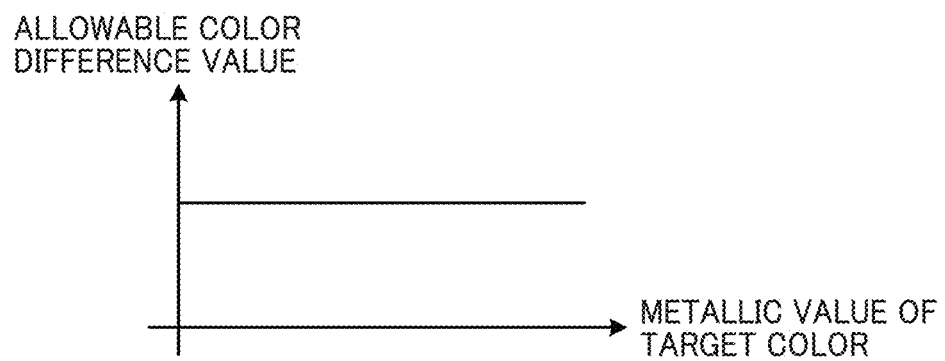
FIG. 9 is a diagram illustrating an allowable color difference value.
Figure 10:
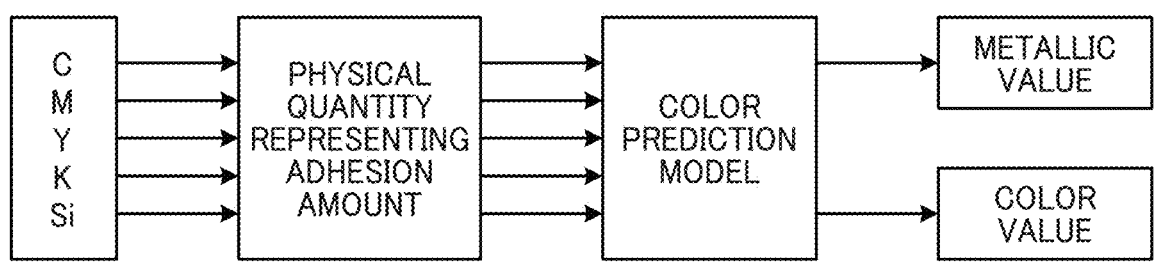
FIG. 10 is a diagram illustrating a color prediction model.

FIG. 7 is a block diagram illustrating an example of a functional configuration of the colorant amount derivation unit of the information processing apparatus according to the present embodiment. FIG. 8 is a diagram illustrating an allowable metallic difference value. FIG. 9 is a diagram illustrating an allowable color difference value. FIG. 10 is a diagram illustrating a color prediction model. The functional configuration and operation of the colorant amount derivation unit 103 of the information processing apparatus 10 according to the present embodiment is described with reference to FIGS. 7 to 10.

As illustrated in FIG. 7, the colorant amount derivation unit 103 of the information processing apparatus 10 includes an allowable value determination unit 1031 (first determination unit, second determination unit), a color prediction model acquisition unit 1032, and a search unit 1033.

The allowable value determination unit 1031 is a functional unit that determines allowable values for metallic difference and color difference as described below. Based on the metallic value and the color value calculated by the reproduction characteristic acquisition unit 102, the allowable value determination unit 1031 determines which of the color and metallicity, which are reproduction characteristics of the target color, should be prioritized. With regard to the target color, which is the metallic color, the following opinion has been obtained experimentally related to classification of the metallic color.

(Category a) Colors with priority given to metallicity are colors with high metallicity, colors with low chroma, or colors of highlight type.

(Category b) Colors with priority given to color are colors with high saturation or dark shadowy colors.

The allowable value determination unit 1031 determines to which of (category a) or (category b) the target color belongs, based on the metallic value and color value of the target color. In the case the target color is (category a), the allowable value determination unit 1031 determines the metallicity as the first priority, and the color as the second priority. In the case the target color is (category b), the allowable value determination unit 1031 determines the color as the first priority and the metallicity as the second priority.

FIG. 8 is a graph illustrating a relationship between the metallic value of the target color (horizontal axis) and the allowable value (vertical axis) of the metallic difference (an example of a difference). The metallic difference is a differential value with respect to the metallic value of the target color and a certain metallic value. As illustrated in the graph of FIG. 8, the allowable metallic difference value has a valley shape, and can be divided into regions A, B, and C with respect to the metallic value on the horizontal axis. With the bottom of the valley (the portion corresponding to the boundary value X described below) as a boundary, the lower the metallic value (i.e., the higher the color value), the larger the allowable metallic difference value for, and the higher the metallic value (i.e., the lower the color value), the larger the allowable value. As described above, "highly metallic color, low saturation color, or highlight color" belonging to (category a) mainly belongs to region C. Also, "highly saturated color or dark shadowy color" belonging to (category b) mainly belongs to region A. The colors belonging to these regions A and C are difficult colors to reproduce in the underlay printing of electrophotographic printing. The reason is that the color of the region A has a larger amount of toner in the upper layer than the metallic layer and the reflected light from the metallic layer is shielded and the color of the region C is a color in which the metallic patch of the target color formed by offset printing has a high brightness. On the other hand, colors belonging to region B are colors that can be reproduced by the underlay printing of electrophotographic printing. Accordingly, the shape of the allowable metallic difference value is set to the valley shape as illustrated in FIG. 8, and the allowable values belonging to the regions A and C are set high. The allowable value determination unit 1031 determines the allowable value corresponding to the metallic value of the target color (the metallic value derived by the reproduction characteristic acquisition unit 102) from the graph illustrated in FIG. 8 as the allowable metallic difference value. Also, the metallic value of the target color that is easiest to reproduce in the electrophotographic underlay printing (that is, the metallic value corresponding to the bottom of the valley-shaped graph in FIG. 8) is set to the boundary value X (predetermined value, second threshold) and in the case the metallic value derived by the reproduction characteristic acquisition unit 102 is less than the boundary value X, the allowable value determination unit 1031 gives priority to the color (color value), and in the case the metallic value derived by the reproduction characteristic acquisition unit 102 is equal to or greater than the boundary value X, priority is given to the metallicity (metallic value). Note that the method of determining the priority by the allowable value determination unit 1031 is not limited to the comparison between the metallic value and the boundary value X. For example, the determination may be made by comparing the color value and the predetermined value Y (third threshold value, fourth threshold value). That is, when the color value derived by the reproduction characteristic acquisition unit 102 is equal to or greater than a predetermined value Y, the allowable value determination unit 1031 gives priority to the color (color value), and when the color value is less than the predetermined value Y, the metallicity (metallic value) may be prioritized.

FIG. 9 is a graph illustrating the relationship between the metallic value of the target color (horizontal axis) and the allowable value (vertical axis) of the color difference (an example of the difference). The color difference is a differential value with respect to a color value of a target value for a certain color value. As illustrated in FIG. 9, the allowable color difference value takes a constant value regardless of the metallic value of the target color. The allowable value determination unit 1031 determines the allowable value (constant value in the example illustrated in FIG. 9) corresponding to the metallic value (the metallic value derived by the reproduction characteristic acquisition unit 102) of the target color from the graph illustrated in FIG. 9 as the allowable color difference value.

Then, allowable value determination unit 1031 sends the determined priority and the allowable values of metallic difference and color difference to the search unit 1033.

The color prediction model acquisition unit 1032 is a functional unit for acquiring a color prediction model corresponding to the image forming apparatus 30 from the storage unit 105 and for sending the color prediction mode to the search unit 1033. FIG. 10 illustrates the contents of processing of the color prediction model. The color prediction model outputs the metallic value and the color value of the metallic color expected to be reproduced by the image forming apparatus 30 by inputting the physical quantity representing the adhesion amount for the five-color device value (C, M, Y, K, Si). Among the color prediction models, a model that outputs a metallic value of a metallic color that is predicted to be reproduced from a physical quantity that indicates the adhesion amount of the five-color device value is called a metallic value prediction model and a model that outputs a color value of a metallic color that is predicted to be reproduced from a physical quantity that indicates the attached amount of five-color device value is called a color value prediction model. According to the present embodiment, the metallic value prediction model outputs the flop index represented by the above formula (1) as the metallic value, and the color value prediction model outputs the Lab value representing saturation and density in the 45-degree direction as the color value.

A method for creating a color prediction model is described. First, the image forming apparatus 30 prints the color patches of various combinations of five-color device values. Then, for each color patch, as illustrated in FIG. 6, the colorimeter 40 acquires colorimetric values measured in multiple directions. The result is a metallic value and a color value for each color patch. Then, based on these values, the metallic value prediction model for acquiring the metallic values and the color value prediction model for acquiring the color values are created by inputting the five-color device values. As functions used for these color prediction models, general functions for color prediction models such as multiple regression equations, neural networks, and interpolation using direct lookup tables can be used. The created color prediction model is stored in the storage unit 105.

Note that the color prediction model may be a model corresponding to each paper used in the image forming apparatus 30.

The search unit 1033 is a functional unit that derives the five-color device value according to the priority, from the metallic values and color values calculated by the reproduction characteristic acquisition unit 102, the priority determined by the allowable value determination unit 1031, and the allowable values of metallic difference and color difference, using the color prediction model received from the color prediction model acquisition unit 1032 and sends the five-color device value according to the priority, to the dictionary creation unit 104. Details of the processing by the search unit 1033 are described below with reference to FIG. 15.

FIGS. 11A and 11B are diagrams illustrating an example of the spot color dictionary. The operation of the dictionary creation unit 104 of the information processing apparatus 10 according to the present embodiment is described with reference to FIGS. 11A and 11B.

First, the dictionary creation unit 104 reads information on the target color (target color on which the colorimetric values acquired by the colorimetric value acquisition unit 101 are based) from the storage unit 105. The information is, for example, a color name. Then, the dictionary creation unit 104 creates the spot color dictionary by associating the five-color device value calculated by the search unit 1033 with the read target color information (color name).

FIG. 11A illustrates an example of the spot color dictionary that associates the color name with the Lab value, and FIG. 11B illustrates another example of the spot color dictionary that associates the color name with a four-color device value (CMYK). The spot color dictionary created by the dictionary creation unit 104 of the information processing apparatus 10 according to the present embodiment associates the five-color device value obtained by adding Si (metallic silver) to the four-color device value illustrated in FIG. 11B. The dictionary creation unit 104 causes the storage unit 105 to store the created spot color dictionary.

Figure 12:
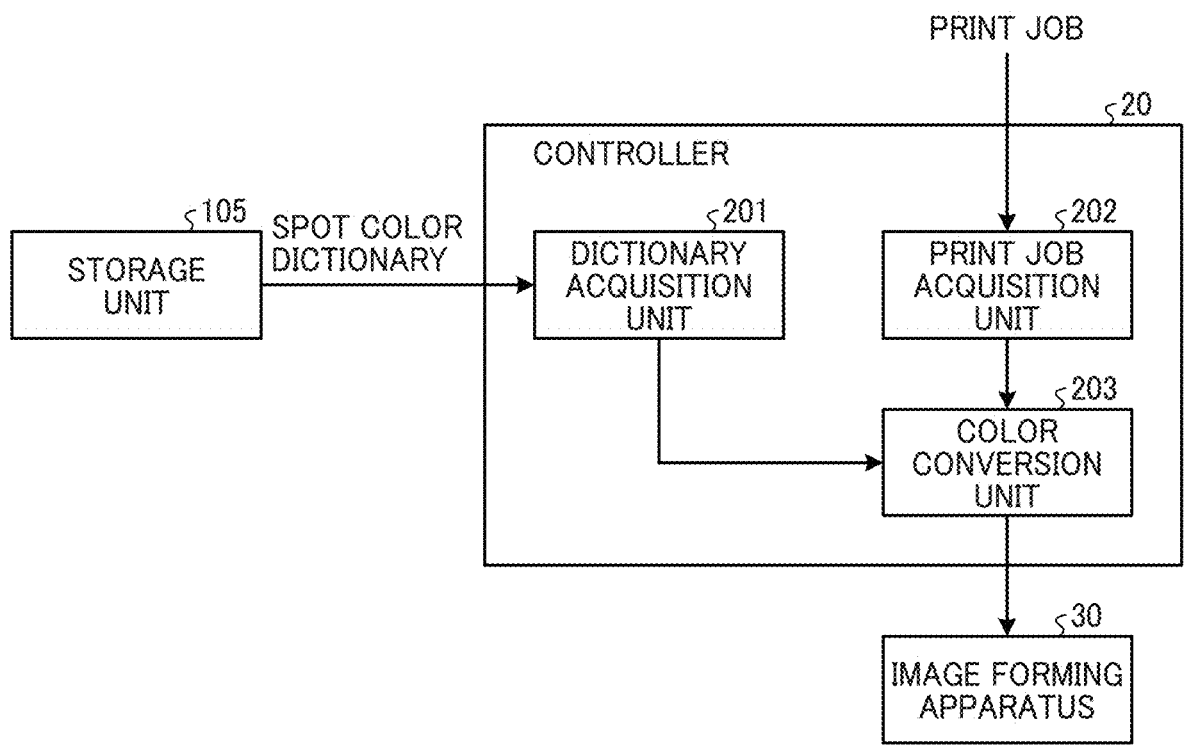
FIG. 12 is a block diagram illustrating an example of a functional configuration of a controller according to embodiments of the present disclosure.

FIG. 12 is a block diagram illustrating an example of a functional configuration of the controller according to the present embodiment.

The functional configuration and operation of the controller 20 according to the present embodiment is described with reference to FIG. 12.

As illustrated in FIG. 12, the controller 20 includes a dictionary acquisition unit 201, a print job acquisition unit 202 and a color conversion unit 203.

The dictionary acquisition unit 201 is a functional unit that acquires the spot color dictionary stored in the storage unit 105 of the information processing apparatus 10 and sends the spot color dictionary to the color conversion unit 203.

The print job acquisition unit 202 is a functional unit that acquires a print job from outside (for example, the information processing apparatus 10 or the like) and sends the print job to the color conversion unit 203.

The color conversion unit 203 is a functional unit that performs color conversion processing for converting the spot color designated in the print job into the five-color device value based on the spot color dictionary received from the print job acquisition unit 202. The color conversion unit 203 transmits the image data obtained by the color conversion processing to the image forming apparatus 30.

The dictionary acquisition unit 201, the print job acquisition unit 202, and the color conversion unit 203 described above are implemented by executing programs by the CPU 601 illustrated in FIG. 2. At least a part of the functional units of the controller 20 illustrated in FIG. 12 implemented by software (programs) may be implemented by hardware circuits such as FPGA or ASIC.

Further, each functional unit of the controller 20 illustrated in FIG. 12 conceptually illustrates a function and is not limited to such configuration. For example, a plurality of functional units illustrated as independent functional units in the controller 20 illustrated in FIG. 12 may be configured as one functional unit.

On the other hand, in the controller 20 illustrated in FIG. 12, function of one functional unit may be divided into a plurality of units to be configured as a plurality of functional units.

Figure 13:
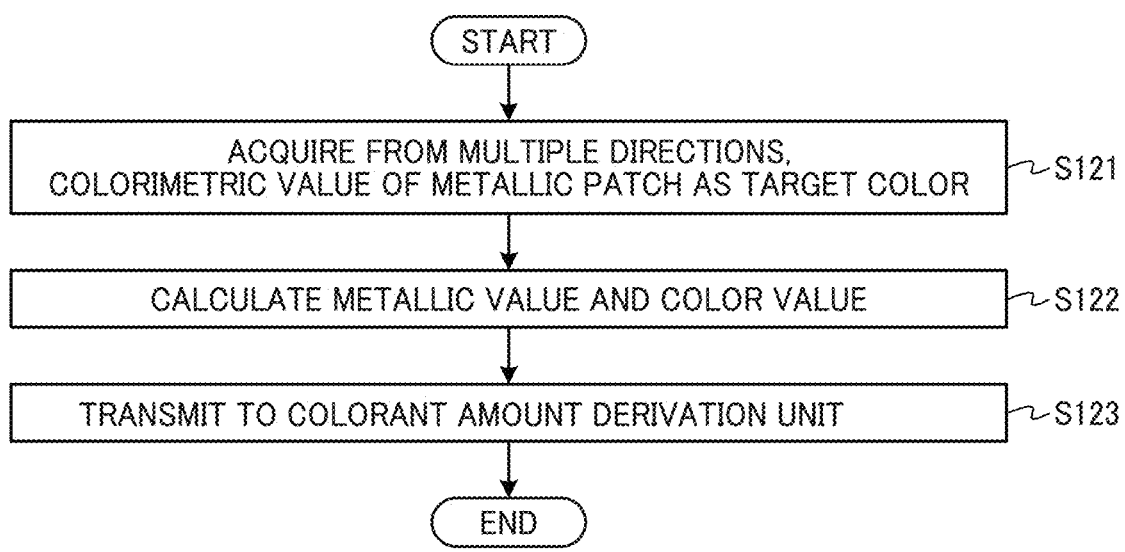
FIG. 13 is a flowchart illustrating an example of a process executed by a reproduction characteristic acquisition unit of the information processing apparatus according to embodiments of the present disclosure.

FIG. 13 is a flowchart illustrating an example of a process executed by the reproduction characteristic acquisition unit of the information processing apparatus according to the present embodiment. The process executed by the reproduction characteristic acquisition unit 102 of the information processing apparatus 10 according to the present embodiment is described with reference to FIG. 13. Note that the processing by the reproduction characteristic acquisition unit 102 is included in the processing of step S12 illustrated in FIG. 4 described above.

In step S121, the reproduction characteristic acquisition unit 102 of the information processing apparatus 10 acquires a plurality of colorimetric values obtained by measuring the target color (metallic color) patch from the plurality of directions by the colorimeter 40 acquired by the colorimetric value acquisition unit 101.

In step S122, the reproduction characteristic acquisition unit 102 calculates the metallic value Sof and the color value Eof from the plurality of colorimetric values by the calculation method described above.

In step S123, the reproduction characteristic acquisition unit 102 sends the calculated metallic value Sof and color value Eof to the colorant amount derivation unit 103.

The reproduction characteristic acquisition unit 102 executes the process of steps S121 to S123 described above.

Figure 14:
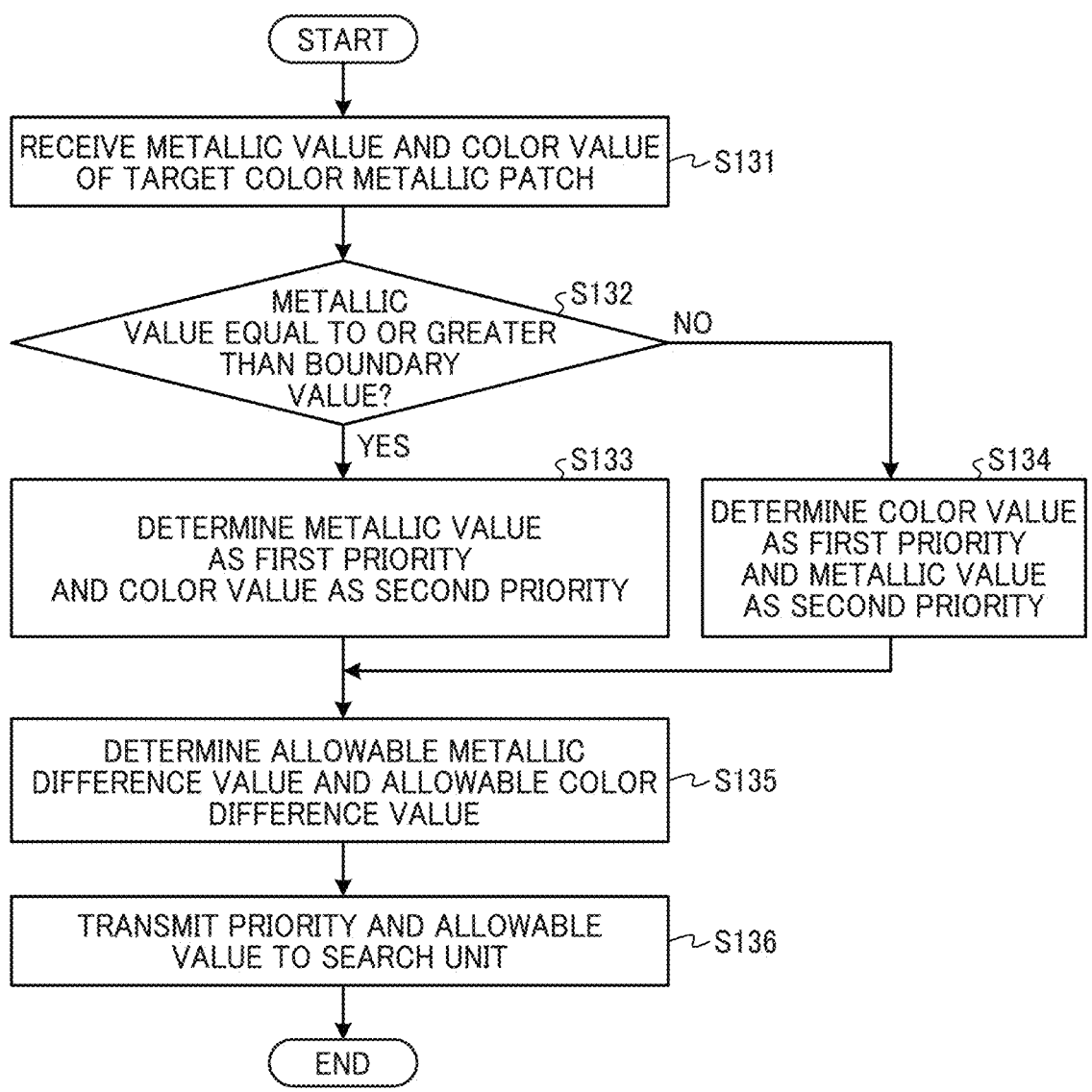
FIG. 14 is a flowchart illustrating an example of a process executed by an allowable value determination unit of the information processing apparatus according to embodiments of the present disclosure.

FIG. 14 is a flowchart illustrating an example of a process executed by the allowable value determination unit of the information processing apparatus according to the present embodiment. With reference to FIG. 14, the process executed by the allowable value determination unit 1031 of the colorant amount derivation unit 103 of the information processing apparatus 10 according to the present embodiment is described. Note that the process executed by the allowable value determination unit 1031 is included in the process of step S13 illustrated in FIG. 4 described above.

In step S131, the allowable value determination unit 1031 of the colorant amount derivation unit 103 of the information processing apparatus 10 receives the metallic value Sof and the color value Eof corresponding to the metallic patch of the target color calculated by the reproduction characteristic acquisition unit 102.

In step S132, the allowable value determination unit 1031 determines whether the metallic value Sof of the target color is equal to or greater than the boundary value X. Here, the boundary value X is, as described above, the metallic value corresponding to the bottom of the graph of allowable metallic difference value in FIG. 8. In the case the metallic value Sof of the target color is greater than or equal to the boundary value (step S132: Yes), the process proceeds to step S133, and in the case the metallic value Sof of the target color is less than the boundary value (step S132: No), the process proceeds to step S134.

In the case the metallic value Sof of the target color is equal to or greater than the boundary value X, the allowable value determination unit 1031 determines the metallic value Sof as the first priority and the color value Eof as the second priority in step S133 and the process proceeds to step S135.

In the case the metallic value Sof of the target color is less than the boundary value X, the allowable value determination unit 1031 determines the color value Eof as the first priority and the metallic value Sof as the second priority in step S134 and the process proceeds to step S135.

In step S135, the allowable value determination unit 1031 determines the allowable value corresponding to the metallic value Sof of the target color from the graph illustrated in FIG. 8 as the allowable metallic difference value $\Delta$Stol. Also, the allowable value determination unit 1031 determines the allowable value corresponding to the metallic value of the target color from the graph illustrated in FIG. 9 as the allowable color difference value $\Delta$Etol.

In step S136, the allowable value determination unit 1031 sends the determined priority, the allowable metallic difference value $\Delta$Stol and the allowable color difference value $\Delta$Etol to search unit 1033.

The allowable value determination unit 1031 executes the process of steps S131 to S136 described above.

Figure 15:
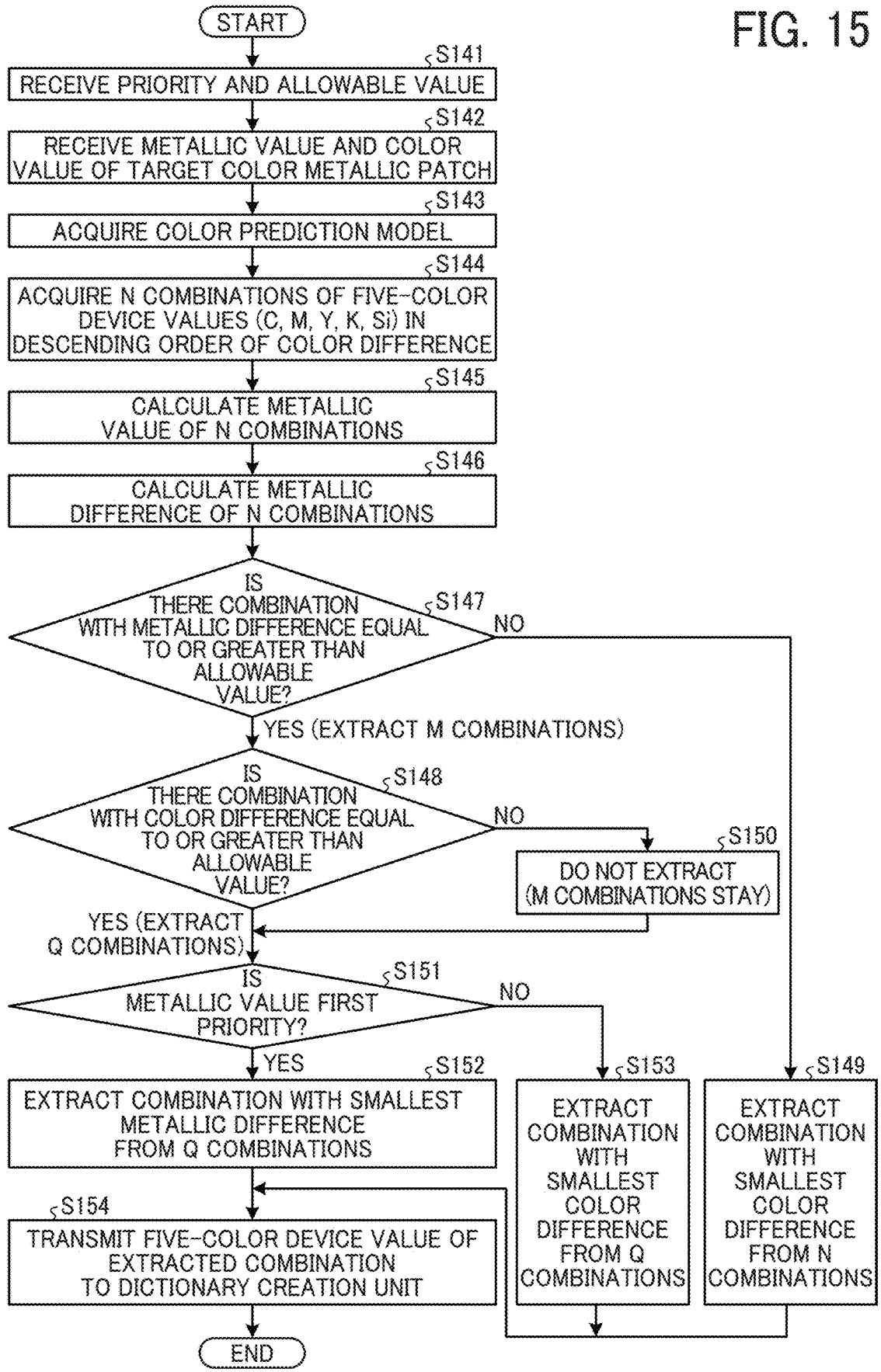
FIG. 15 is a flowchart illustrating an example of a process executed by a search unit of the information processing apparatus according to embodiments of the present disclosure.

FIG. 15 is a flowchart illustrating an example of a process executed by the search unit of the information processing apparatus according to the present embodiment. The process executed by the search unit 1033 of the colorant amount derivation unit 103 of the information processing apparatus 10 according to the present embodiment is described with reference to FIG. 15. Note that the process executed by the search unit 1033 is included in the process of step S14 illustrated in FIG. 4 described above.

In step S141, the search unit 1033 of the colorant amount derivation unit 103 of the information processing apparatus 10 receives the priority, the allowable metallic difference value $\Delta$Stol and the allowable color difference value $\Delta$Etol from the allowable value determination unit 1031.

In step S142, the search unit 1033 receives the metallic value Sof and the color value Eof of the target color calculated by the reproduction characteristic acquisition unit 102.

In step S143, the color prediction model acquisition unit 1032 acquires the color prediction models (the metallic value prediction model and the color value prediction model) corresponding to the image forming apparatus 30 from the storage unit 105 and sends the color prediction models to the search unit 1033. The search unit 1033 receives the color prediction models from the color prediction model acquisition unit 1032.

In step S144, the search unit 1033 obtains N combinations of the five-color device values (C, M, Y, K, Si) in descending order of color difference from the color value Eof of the target color using the color value prediction model. As a result, the search unit 1033 obtains N color differences $\Delta$Erep_1, $\Delta$Erep_2, to $\Delta$Erep_N. Here, the reason for acquiring the N combinations of the five-color device values based on the color difference of the color value is that in the case the five-color device values are obtained based on the metallic difference of the metallic value, the reproducibility of the target color may be greatly impaired.

In step S145, the search unit 1033 calculates N metallic values Srep_1, Srep_2, to Srep_N from the N combinations of the five-color device values using the metallic value prediction model.

In step S146, the search unit 1033 calculates N metallic differences $\Delta$Srep_1, $\Delta$Srep_2, to $\Delta$Srep_N that are the difference between the metallic value Sof of the target color and the N metallic values Srep_1, Srep_2, to Srep_N.

In step S147, the search unit 1033 determines whether there is a metallic difference equal to or less than the allowable value $\Delta$Stol among the N metallic differences $\Delta$Srep_1, $\Delta$Srep_2, to $\Delta$Srep_N. Based on a determination that there is a combination of five-color device value with a metallic difference equal to or less than the allowable value $\Delta$Stol (step S147: Yes), the number is set to M, and the process proceeds to step S148. On the other hand, based on a determination that there is no combination of five-color device value in which the metallic difference is equal to or less than the allowable value $\Delta$Stol (step S147: No), the process proceeds to step S149.

In step S148, the search unit 1033 determines whether there is a color difference equal to or less than the allowable value $\Delta$Etol among the M color differences corresponding to the combinations of the M five-color device values. Based on a determination that there is a combination of five-color device values whose color difference is equal to or less than the allowable value $\Delta$Etol (step S148: Yes), the number is set to Q, and the Q five-color device values are processed in the next step S151. On the other hand, based on a determination that there is no combination of five-color device value with the color difference equal to or less than the allowable value $\Delta$Etol (step S148: No), the process proceeds to step S150.

In step S149, the search unit 1033 extracts a combination of five-color device value corresponding to the minimum color difference among the color differences corresponding to the N combinations of five-color device values, in the case there is no metallic difference equal to or less than the allowable value $\Delta$Stol, among the N metallic differences corresponding to N combinations of the five-color device values, $\Delta$Srep_1, $\Delta$Srep_2, to $\Delta$Srep_N. That is, since there is no five-color device value for which the metallic difference is equal to or less than the allowable value $\Delta$Stol in step S147, the search unit 1033 extracts a combination of five-color device value with the smallest color difference regardless of the priority determined by the allowable value determination unit 1031. Then, the process proceeds to step S154.

In step S150, in the case there is no combination of five-color device value in which the color difference is equal to or less than the allowable value ΔEtol among the M color differences corresponding to the M combinations of five-color device values, the search unit 1033, the M five-color device values are to be processed in the next step S151.

In step S151, the search unit 1033 determines whether the priority received from the allowable value determination unit 1031 indicates that the metallic value is given the first priority (priority is given to the metallic value). Based on a determination that the metallic value has the higher priority (metallic value is prioritized) (step S151: Yes), the process proceeds to step S152. On the other hand, based on a determination that the color value has the higher priority (color value is prioritized) (step S151: No), the process proceeds to step S153.

In step S152, the search unit 1033 derives the combination of the five-color device value corresponding to the smallest metallic difference among the Q (M in the case of step S150) combinations of the five-color device values.

In step S153, the search unit 1033 derives the combination of the five-color device value corresponding to the minimum color difference among the Q (M in the case of step S150) combinations of the five-color device values.

In step S154, the search unit 1033 sends the derived five-color device value to the dictionary creation unit 104.

The search unit 1033 executes the process of steps S141 to S154 described above.

Note that in step S142, the search unit 1033 determines that the color value Eof obtained from the reproduction characteristic acquisition unit 102 is extremely high (for example, when the color value Eof exceeds a predetermined value η (first threshold value), the five-color device value may be derived so that Si (metallic silver) toner colorant is not used for underlay printing (the device value of Si is set to 0).

Further, in the information processing apparatus 10 described above, the reproduction characteristic acquisition unit 102 calculates two physical quantities, the metallic value and the color value, from the plurality of colorimetric values obtained from the colorimetric value acquisition unit 101, but the process is not limited to the process described here. For example, the reproduction characteristic acquisition unit 102 may calculate two or more physical quantities including the metallic value and the color value from a plurality of colorimetric values as evaluation values. In this case, the allowable value determination unit 1031 determines the priority and allowable value for each physical quantity, and the search unit 1033 may derive the five-color device value based on each physical quantity and allowable value according to the priority.

As described above, in the information processing apparatus 10 according to the present embodiment, the colorimetric value acquisition unit 101 acquires colorimetric values measured by the colorimeter 40 with respect to the target color patch with metallicity, the reproduction characteristic acquisition unit 102 calculates at least two physical quantities including the metallic value indicating the degree of metallicity and the color value indicating the degree of color tone from the colorimetric value obtained by the colorimetric value acquisition unit 101, the allowable value determination unit 1031 determines the priority of each physical quantity of the target color, and the search unit 1033 derives the colorant amounts (five-color device values) of the metallic colorant and the process color colorant in the image forming apparatus 30 from two or more physical quantities according to the priority. As a result, the present embodiment enables to perform color reproduction giving priority to color when color is prioritized and color reproduction giving priority to metallicity when metallicity is prioritized.

The information processing system 1 according to a modified embodiment is described focusing on points that are different from the information processing system 1 according to the above-described embodiment. In the information processing system 1 according to the above-described embodiment, the colorant amount derivation unit 103 of the information processing apparatus 10 determines whether to give priority to metallicity or to give priority to color. In the information processing system 1 according to the modified embodiment, an operation of manually setting whether to give priority to metallicity or to give priority to color by the user is described. The overall configuration of the information processing system 1 according to the modified embodiment and the hardware configuration of each component are the same as those described in the above-described embodiment.

Figure 16:
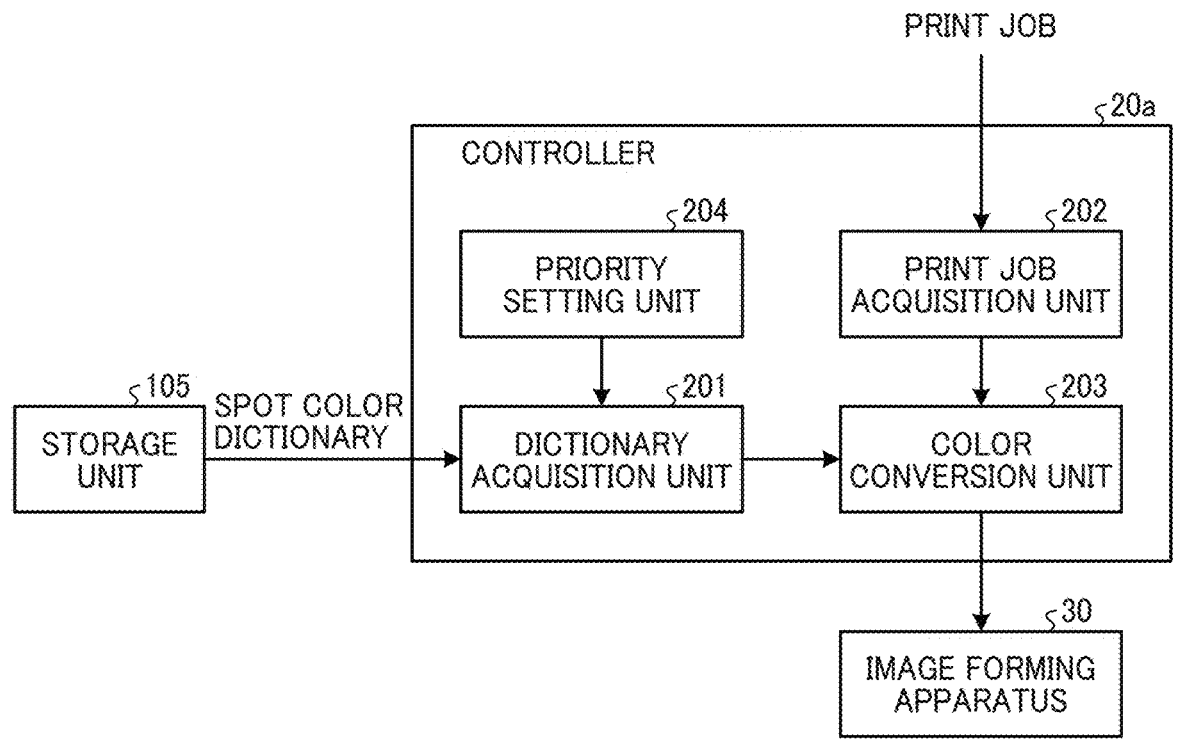
FIG. 16 is a block diagram illustrating an example of functional configuration of the controller according to a modified embodiment.
Figure 17:
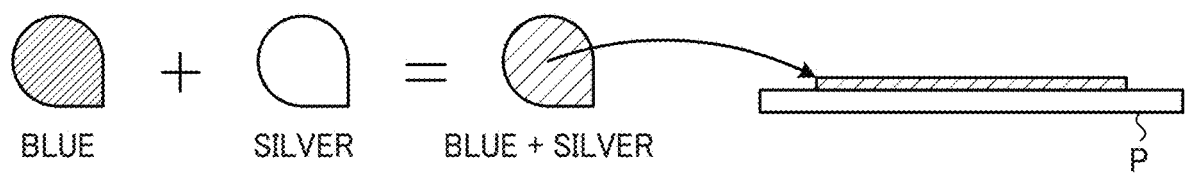
FIG. 17 is a diagram illustrating offset printing.
Figure 18:
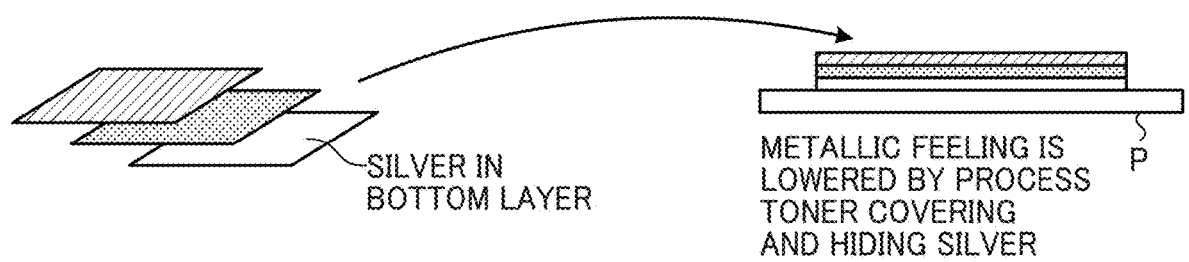
FIG. 18 is a diagram illustrating electrophotographic printing.

FIG. 16 is a block diagram illustrating an example of functional configuration of the controller according to the modified embodiment. The functional configuration and operation of a controller 20a according to the modified embodiment is described with reference to FIG. 16.

In the modified embodiment, the allowable value determination unit 1031 of the colorant amount derivation unit 103 of the information processing apparatus 10 does not determine priority based on the metallic value received from the reproduction characteristic acquisition unit 102. The search unit 1033 of the colorant amount derivation unit 103 determines the five-color device value when the metallic value is prioritized and the five-color device value when the color value is prioritized by the same method as in the above embodiment, and both five-color device values are sent to the dictionary creation unit 104. Then, the dictionary creation unit 104 associates the five-color device value with priority to the metallic value received by the dictionary creation unit 104 with the information of the target color, and creates the spot color dictionary giving priority to the metallicity. Furthermore, the dictionary creation unit 104 associates the five-color device value with priority to the color value received by the dictionary creation unit 104 with the target color information, thereby creating the spot color dictionary with priority on the color value. The dictionary creation unit 104 causes the storage unit 105 to store the created spot color dictionary with priority on metallicity and the spot color dictionary with priority on color.

As illustrated in FIG. 16, the controller 20a includes a dictionary acquisition unit 201, a print job acquisition unit 202, a color conversion unit 203, and a priority setting unit 204 (setting unit). Note that the operations of the print job acquisition unit 202 and the color conversion unit 203 are the same as those described in the above embodiment.

The priority setting unit 204 is a functional unit that sets the order of priority to give priority to the metallicity or to give priority to the color according to the operation of the keyboard 611 and the mouse 612 of the controller 20a. The priority setting unit 204 sends the set priority to the dictionary acquisition unit 201. Note that the priority setting unit 204 may set the priority according to the operation of the keyboard 611 and the mouse 612 (that is, the operation unit 106) of the information processing apparatus 10.

The dictionary acquisition unit 201 acquires from the storage unit 105 the spot color dictionary corresponding to the priority received from the priority setting unit 204 and sends the spot color dictionary to the color conversion unit 203. Specifically, when the priority is given to the metallicity, the dictionary acquisition unit 201 obtains the spot color dictionary with metallic priority from the storage unit 105, and when the priority is given to the color, the spot color dictionary with color priority is obtained from the storage unit 105.

Note that the color conversion unit 203 converts the spot color designated in the print job into five-color device value using the spot color dictionary that prioritizes one of the reproduction characteristics acquired by the dictionary acquisition unit 201, but the present embodiment is not limited to this configuration. For example, the function of the priority setting unit 204 may be such that giving priority to metallicity or giving priority to color may be set for each object (each color) included in the print job.

The dictionary acquisition unit 201, the print job acquisition unit 202, the color conversion unit 203, and the priority setting unit 204 described above are implemented by executing programs by the CPU 601 illustrated in FIG. 2. At least a part of the functional units of the controller 20 illustrated in FIG. 16 implemented by software (programs) may be implemented by hardware circuits such as FPGA or ASIC.

Further, each functional unit of the controller 20 illustrated in FIG. 16 conceptually illustrates a function and is not limited to such a configuration. For example, a plurality of functional units illustrated as independent functional units in the controller 20a illustrated in FIG. 16 may be configured as one functional unit. On the other hand, in the controller 20a illustrated in FIG. 16, function of one functional unit may be divided into a plurality of units to be configured as a plurality of functional units.

As described above, in the information processing system 1 according to the modified embodiment, the spot color dictionary is created according to the priority designated by the user. As a result, the modified embodiment enables to reproduce the metallic color, which is the target color, according to the reproduction characteristics intended by the user.

In the modified embodiment, the dictionary creation unit 104 creates in advance the spot color dictionary with metallic priority and the spot color dictionary with color priority. Although one of the spot color dictionaries is used according to the priority set by the priority setting unit 204 of the controller 20a, the modified embodiment is not limited to this configuration. For example, the function of setting the priority by the priority setting unit 204 may be provided in the information processing apparatus 10, the order of priority may be set according to the user's operation of the keyboard 611 and mouse 612 to determine whether to give priority to metallicity or to give priority to color, and the dictionary creation unit 104 may cause the storage unit 105 to store the created spot color dictionary.

In the above-described embodiment and the modified embodiment, the description is made based on the image forming apparatus 30 that uses metallic color toner such as silver toner and gold toner. The above-described embodiment and the modified embodiment is not limited to this configuration, and the above-described embodiment and the modified embodiment may also be applied to an image forming apparatus that performs printing using a lustrous colorant such as a pearl colorant, which has a different color tone depending on the viewing direction.

Further, in the above-described embodiment and the modified embodiment, when at least one of the functional units of the information processing apparatus 10 and the controllers 20 and 20a are implemented by executing a program, the program is preinstalled in a ROM or the like and provided. Further, in the above-described embodiment and the modified embodiment, the programs executed by the information processing apparatus 10 and the controllers 20 and 20a may be provided by being recorded in a computer-readable recording medium such as a compact disc read only memory (CD-ROM), a flexible disk (FD), a compact disc-recordable (CD-R), a digital versatile disc (DVD), or a secure digital (SD) card as a file in an installable format or an executable format. Further, in the above-described embodiment and the modified embodiment, the programs executed by the information processing apparatus 10 and the controllers 20 and 20a may be stored in a computer connected to a network such as the internet and provided by being downloaded through the network. Further, in the above-described embodiment and the modified embodiment, the programs executed by the information processing apparatus 10 and the controllers 20 and 20a may be provided or distributed through a network such as the Internet. Further, in the above-described embodiment and the modified embodiment, the programs executed by the information processing apparatus 10 and the controllers 20 and 20a have a module configuration that includes at least one of the above-described functional units, and as actual hardware, the CPU 601 reads and executes the program from the above-described storage device (ROM 602, auxiliary storage device 605, etc.), each functional unit described above is loaded onto the main storage device (RAM 603) and generated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
acquire colorimetric values from a patch of a target color with metallicity, the colorimetric values being measured by a colorimeter;
calculate two or more physical quantities including a metallic value indicating a degree of metallicity and a color value indicating a degree of color from the colorimetric values;

determine priority of the physical quantities of the target color; and derive an amount of metallic colorant and an amount of process color colorant in an image forming apparatus from the two or more physical quantities according to the priority without determining the priority again.

2. The information processing apparatus of claim 1, wherein the circuitry is configured to calculate the metallic value based on the colorimetric values of the patch measured from a plurality of directions.

3. The information processing apparatus of claim 2, wherein the circuitry is further configured to:

determine an allowable value corresponding to each physical quantity;

acquire colorant amounts for multiple metallic colorants and multiple process color colorants according to a color prediction model for predicting each physical quantity from the amount of metallic colorant and the amount of process color colorant; and derive a colorant amount with a smallest difference for the physical quantity with the highest priority, among the colorant amounts for which difference between each physical quantity corresponding to a plurality of acquired colorant quantities and each physical quantity of the target color is equal to or less than the allowable value for each physical quantity.

4. The information processing apparatus of claim 3, wherein the circuitry is further configured to:

calculate the metallic value and the color value of the target color from the colorimetric values; and determine an allowable value for the difference in metallic value, such that the allowable value increases as the metallic value of the target color increases with respect to a value, and the allowable value increases as the metallic value of the target color decreases with respect to the value.

5. The information processing apparatus of claim 1, wherein the image forming apparatus is configured to use the metallic colorant for underlay printing.

6. The information processing apparatus of claim 5, wherein the circuitry is configured to set the colorant amount of the metallic colorant to 0 in response to the color value of the target color exceeding a first threshold.

7. The information processing apparatus of claim 1, wherein the circuitry is further configured to determine priority of each of the physical quantities of the target color based on at least one of the two or more physical quantities of the target color.

8. The information processing apparatus of claim 7, wherein the circuitry is further configured to:

calculate the metallic value and the color value of the target color from the colorimetric values; and determine the priority of the metallic value and the color value of the target color based on the metallic value of the target color.

9. The information processing apparatus of claim 7, wherein the circuitry is further configured to:

calculate the metallic value and the color value of the target color from the colorimetric values; and determine the priority of the metallic value to be higher than the priority of the color value based on a determination that the metallic value of the target color is equal to or greater than a second threshold value, or based on a determination that the color value of the target color is less than a third threshold value.

10. The information processing apparatus of claim 9, wherein the circuitry is further configured to:

calculate the metallic value and the color value of the target color from the colorimetric values; and determine the priority of the color value to be higher than the priority of the metallic value based on a determination that the color value of the target color is equal to or greater than a fourth threshold.

11. The information processing apparatus of claim 1, wherein the circuitry is further configured to determine the priority of each physical quantity of the target color according to an operation on a user interface.

12. The information processing apparatus of claim 1, wherein the circuitry is further configured to create a dictionary associating the derived colorant amount with the target color corresponding to the colorant amount.

13. An information processing system comprising:

the information processing apparatus of claim 12;

a controller configured to generate image data by converting target colors designated in a print job into colorant amounts of metallic colorants and colorant amounts of process color colorants using the dictionary; and an image forming apparatus configured to print the image data.

14. An information processing system comprising:

the information processing apparatus of claim 1;

a controller; and the image forming apparatus including circuitry configured to:

derive the colorant amount in response to each of the physical quantities being given priority; and create a dictionary associating each of the colorant amounts when each of the physical quantities is prioritized and the target color corresponding to each of the colorant amounts, and the controller including circuitry configured to:

set the priority of each physical quantity of the target color according to an operation on a user interface; and generate image data by converting target colors designated in a print job into colorant amounts of metallic colorants and colorant amounts of process color colorants, using the dictionary according to the priority.

15. The information processing apparatus of claim 1, wherein the circuitry is configured to determine the priority prior to deriving the amount of the metallic colorant and the amount of the process colorant.

16. The information processing apparatus of claim 1, wherein the circuitry is configured to determine the priority between a metallicity priority and a color priority.

17. The information processing apparatus of claim 1, wherein the circuitry is configured to determine an output color mixture by determining the priority and deriving the metallic colorant and the amount of process color colorant, and wherein the circuitry is configured to determine the priority only once per output color mixture determination.

18. An information processing method comprising:
- acquiring colorimetric values from a patch of a target color with metallicity, the colorimetric values being measured by a colorimeter;
- calculating two or more physical quantities including a metallic value indicating a degree of metallicity and a color value indicating a degree of color from the colorimetric values;
- determining priority of the physical quantities of the target color; and
- deriving an amount of metallic colorant and an amount of process color colorant in an image forming apparatus from the two or more physical quantities according to the priority without determining the priority again.

19. A non-transitory recording medium storing a plurality of instructions which, when executed by one or more processors, causes the processors to perform a method comprising:
- acquiring colorimetric values from a patch of a target color with metallicity, the colorimetric values being measured by a colorimeter;
- calculating two or more physical quantities including a metallic value indicating a degree of metallicity and a color value indicating a degree of color from the colorimetric values;
- determining priority of the physical quantities of the target color; and
- deriving an amount of metallic colorant and an amount of process color colorant in an image forming apparatus from the two or more physical quantities according to the priority without determining the priority again.

* * * * *